United States Patent [19]

[11] 3,928,646
[45] Dec. 23, 1975

[54] METHOD FOR BLENDING TEMPERATURE SENSITIVE INGREDIENTS IN THE PRODUCTION OF DOUGH

[73] Assignee: Cannell Auto-Process Corporation, Columbus, Ohio

[22] Filed: Oct. 11, 1972

[21] Appl. No.: 296,679

[52] U.S. Cl. ............... 426/549; 426/496; 426/498; 426/524; 426/556
[51] Int. Cl.[2] ........................................ A21D 8/02
[58] Field of Search ............... 99/86, 90 R, 192 BB; 426/343, 27, 496, 504, 524, 498, 549, 556

[56] References Cited
UNITED STATES PATENTS

| | | | |
|---|---|---|---|
| 1,927,175 | 9/1933 | Josephson | 426/524 X |
| 3,375,117 | 3/1968 | Schremmer | 426/62 |
| 3,449,131 | 6/1969 | Fritzberg | 426/343 X |

*Primary Examiner*—James R. Hoffman
*Attorney, Agent, or Firm*—Mahoney, Miller & Stebens

[57] ABSTRACT

Process for continuously blending temperature-sensitive ingredients, such as flour and shortening, in a mixing apparatus for the production of dough and simultaneously introducing into the dough mixture, a refrigerant or cooling medium which makes it possible to use a high proportion of shortening. The preferred cooling medium is carbon dioxide in the form of small solidified particles or snow which are introduced into the flour in the initial stages of the blending operation prior to combining of the chilled flour with the shortening. Preferably, the shortening is also subjected to a cooling operation prior to its introduction into the mixing apparatus.

3 Claims, 1 Drawing Figure

U.S. Patent   Dec. 23, 1975   3,928,646
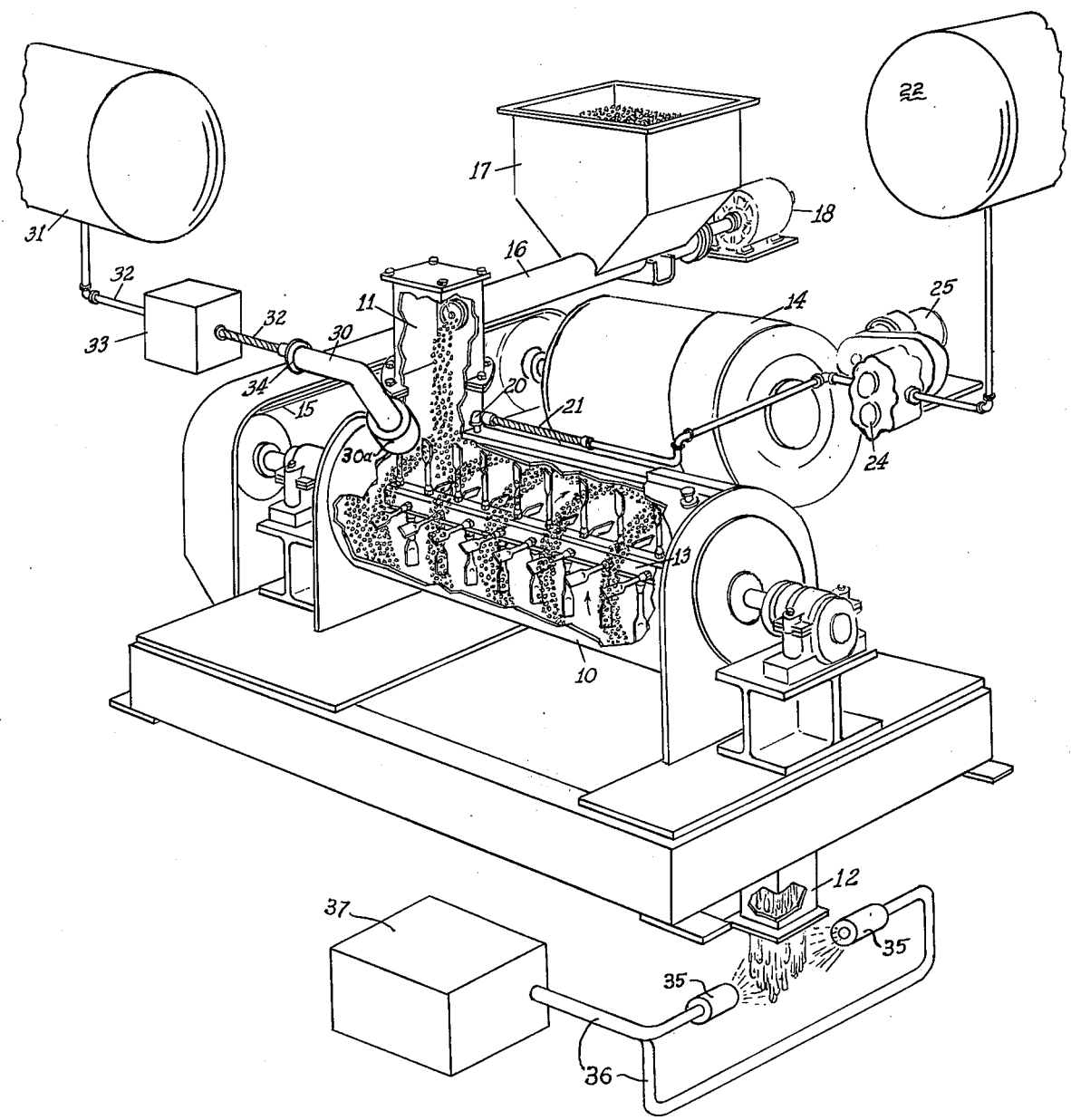

METHOD FOR BLENDING TEMPERATURE SENSITIVE INGREDIENTS IN THE PRODUCTION OF DOUGH

The present invention relates to a method and machine for blending temperature-sensitive ingredients, such as flour and shortening, in the manufacture of doughs. It deals with the blending of such ingredients and the simultaneous blending therewith of a cooling ingredient so that a high proportion of shortening can be incorporated therein.

The purpose of this invention is the provision of an efficient method and apparatus for the continuous and controlled blending of flour, salt, milk, sugar, etc. and a high proportion of shortening agents in the manufacture of doughs. In the manufacture of doughs of high solids content, it is customary to blend shortening with flour, salt, sugar, milk, etc. into a plastic mass ready for forming into shapes to be baked, frozen, etc. i.e., cookie dough into a circle or pie dough into a pie pan. The conventional manufacturing procedure is a batch type operation which limits batch size to the volume of the mixing receptacle; each batch has to be processed in steps to achieve proper blending of ingredients; and the success of such dough making procedures is dependent primarily on the skill of the individual baker. Thus, conventional procedures have inherent problems including human inconsistence, i.e., exposure to less than ideal conditions of sanitation, and problems with various shortening agents, fats, oils, butter, margarine or various blends, due to variations in their inherent characteristics, i.e., congeal points, pour points, or crystal structure. Typically, doughs must be cooled since mixing substantially elevates the temperature and, in many cases, the dough must be even held at refrigerated temperatures for lengthy periods of time, overnight or longer, to achieve desirable processing characteristics. Conventional batch procedures also require high investments in expensive batch equipment, entail the use of many man hours, and routinely provide products with consistency less than the best.

The principal object of the present invention is to provide a simple process in which the above batch operations are eliminated and in which more effective control is maintained over the various factors involved in dough manufacturing and especially the temperature factor. A still further object is to provide a new method and means of dough manufacture in which large volumes can be processed without requiring any handling of the product manually and in a continuous manner thereby eliminating dependence upon the manual "art" of dough preparation. Yet another object is to provide simple and effective process steps, which may be employed to produce a better quality of dough within a shorter period, even though it has a high shortening content.

Early efforts to blend high proportions of shortening agents with flour on a continuous basis to manufacture high solids doughs were unsuccessful mainly because of; 1) inability to prevent incorporation of a heavy heat load into the admixture from the physical energy required to continuously mix the ingredients, 2) inability to control nucleation of the particles around the shortening particles, and 3) inability to control ingredient temperature during the mixing process. As a result, high solids doughs prepared by available continuous processes have been unsatisfactory for further processing. Thus, there has been a need in the art for a new process that will circumvent either some or all of the aforementioned difficulties, and introduce science into dough making. Many attempts have been made to overcome the problems encountered in the production of doughs continuously in the prior art which yielded either minute particles inadequately blended or a sticky pastey mass.

It has been discovered that by subcooling flour through controlled incorporation of particles of a cooling medium, such as $CO_2$ snow, with the flour, and other dry ingredients, results in the cooling of the shortening through the congeal point but not the removal of all latent heat, and maintenance of the desired dough temperature during blending of the ingredients. Thus, it is possible to specifically and absolutely vary characteristics of dough through this temperature control which instantaneously solidifies the shortening to provide a nucleating surface for flour particles to continuously develop the dough.

It has been further discovered that machineability of the product can be controlled immediately and continuously by this temperature control and mixing control. Thus, a saving of time is effected in handling of doughs as compared with the procedures where the dough must be slowly cooled in refrigerated rooms in the conventional manner.

The accompanying drawing is a perspective view, partly cut away of a machine, which can be used in the performance of the process, certain process procedures being illustrated schematically.

With reference to the drawing, there is illustrated a machine suitable for continuously blending the dough-forming ingredients along with the refrigerant or cooling medium. This machine comprises a mixing and blending chamber 10 of drum-like or cylindrical form which has a main inlet passage 11 leading, preferably tangentially, thereinto at one end and at its upper side and an outlet passage 12, leading therefrom at its opposite end and lower side.

Within the chamber 10 is a co-axially disposed blending and mixing screw 13, or rotor with blades, which may have paddles helically arranged. The paddles adjacent the inlet and discharge ends preferably have blunt leading edges to act more as kneaders whereas the intermediate ones preferably have sharper or knife-like leading edges to give more of a slicing and dividing action and to produce turbulence to aid in mixing and cooling. The screw 13 is driven at a selected speed in a suitable manner such as by an adjustable speed motor 14 and a drive 15.

At the upper end of the inlet passage 11, a supply conduit 16 is connected for supplying flour or other dry ingredients. This conduit receives the dry ingredients from a supply hopper 17, the conduit being provided with a screw-feed driven at a selected speed by a motor 18.

Adjacent the inlet passage 11, an inlet 20 for the shortening is provided and leads into the blending chamber 10. This inlet is for supplying the shortening in a semi-liquid or paste-like form and is connected by a conduit 21 to a heat exchanger 22 which cools the shortening to the desired temperature. Liquid shortening is supplied to the heat exchanger 22 from a suitable source (not shown) through a conduit 23. A pump 24 interposed in conduit 21 and driven by an adjustable speed motor 25 is provided to transfer the shortening from the heat exchanger 22 to the mixing chamber 10 through the conduit 21.

An important aspect of this invention is the supplying of a refrigerant or cooling medium in small particle form for blending into the mix and, in particular, cooling of the flour and other dry ingredients prior to their blending with the shortening. These particles are preferably particles of carbon dioxide snow which are supplied through an expansion inlet conduit 30 and valve 30a at the point of injection into the chamber. This conduit preferably leads into the blending chamber 10 at a point closely adjacent the point of introduction of the flour. Thus, the carbon dioxide is effective in cooling the flour immediately and prior to the flour being blended with the shortening which is introduced at a point relatively downstream. The carbon dioxide is supplied from a pressure tank 31 through a conduit 32 which is provided with a suitable selectively adjustable flow control 33. From the conduit 32, the carbon dioxide gas passes through a throttle valve 34 into the larger conduit 30 and then through the injecting valve 30a where it is transformed into snow or solid particles. Then, it is conducted into the chamber 10.

Instead of carbon dioxide, other cooling mediums may be used, such as nitrogen, freon, or other similar substances which can be supplied in the form of small solid particles that can be dispersed and blended in the mix in the chamber 10.

At the time the dough is discharged from the chamber 10, it may be desirable to subject the dough to a salt water spray to increase the moisture content to a desired level and to add a seasoning salt. Adding a seasoning salt at this point is relatively easier than to premix the salt with the flour. For this purpose, a pair of spray nozzles 35 are oppositely positioned to each other at the point where the dough in substantially flake form leaves the discharge 12. The nozzles 35 are connected by respective conduits 36 to a pressurized source 37 of salt-water that may be selectively controlled to eject in a metered ratio to the dough.

In performing the method, the flour and other dry ingredients, such as salt, milk, sugar, etc. are introduced into the chamber 10 at a suitable rate by controlling the speed of the motor 18. The shortening is introduced into the chamber 10 at a suitable rate by controlling the speed of the pump-driving motor 25. The carbon dioxide is introduced at a suitable rate into the chamber 10 under the control of the flow control 33. The speed of the blender screw 13 is controlled by varying the speed of the motor 14 and this determines the rate of mixing or blending and the rate of feed toward the discharge outlet passage 12 where the blended dough is discharged ready for use as desired. The ratio of carbon dioxide to dry mix introduced into the chamber 10 is preferably about 1/5 pound liquid carbon dioxide per one pound of dough.

The liquid shortening in the tank 26 is usually at a high temperature of the order of 130° F. It is chilled in the cooler 22 preferably to a temperature range of about 65° – 75° F. Due to the use of the carbon dioxide snow particles, introduced into the mixture in the chamber 10, and which are at a temperature of about −100° F., the flour and dry ingredients are cooled substantially at the point of their introduction into the chamber and throughout the mixing and blending operation. The shortening, as it is introduced into the chamber 10, is sliced by the mixing screw 13 into particles to which the cold dry flour mix particles will adhere. The particles of carbon dioxide, which are simultaneously introduced, also assure that the shortening particles will be further cooled, if necessary, and maintained within the desired temperature range for proper consistency and provide a nucleating surface on which the dry mix particles will continuously develop into dough. The temperature of the dough is preferably about 40° – 45° F. when it is discharged from the chamber 10 in the case of pie dough.

The use of the cooling particles prevents the development of excessive heat during the mixing and blending operations which would turn the dough into a sticky mass which would be difficult or impossible to handle and could not be blended properly. The mixing and blending action develops heat physically and chemically and without the introduction of the cooling particles, this would melt the shortening rather than congeal it into particles upon which the flour and other dry ingredients may form and thereby form the dough. It will also be noted that the carbon dioxide particles, having served the desired cooling function during the mixing and blending operation, will revert to a gaseous state and will be entrained in the dough at the point of discharge of the dough.

Water-cooling jackets have been used around mixing or blending chambers in the past in an attempt to overcome this difficulty, but have not been successful because they result in the cooling of the walls of the chamber but the cooling action is not transmitted to any extent to the mix as it is being blended and moved through the chamber.

It will be apparent from the above description that my invention provides an effective machine and process for continuously manufacturing doughs even though high shortening contents are used. With this process, it has been found that the proportion of shortening can be increased from a previous maximum in the range of 20 – 25% to a more desirable 40 – 45% for pie doughs. The cooling of the mixture by the controlled introduction of particles of a cooling substance, such as carbon dioxide snow, results in instantaneous solidifying of the shortening agent to provide a nucleating surface for development of the dough. This makes it possible to continuously handle the dough as it is produced and further process the dough immediately into the intended article in contrast to prior procedures requiring that the relatively high-temperature dough be first subjected to a lengthy cooling cycle in a refrigerated room.

Having thus described this invention, what is claimed is:

1. A continuous process of producing high shortening content dough which comprises blending and mixing the dough-forming ingredients which include shortening in a paste or semi-liquid form and dry ingredients and simultaneously blending and mixing therewith particles of a cooling substance that does not form an ingredient of the dough, said cooling substance combined with the dry ingredients and mixed therewith prior to mixing and blending with the shortening to cool and solidify the shortening so as to provide nucleating surfaces for the dry ingredients.

2. The process of claim 1 in which the cooling substance is carbon dioxide snow.

3. The process of claim 1 in which the dry ingredients, liquid shortening and cooling particles are introduced continuously into a mixing chamber and are passed continuously through said chamber to a discharge point as they are mixed.

\* \* \* \* \*

UNITED STATES PATENT OFFICE
CERTIFICATE OF CORRECTION

Patent No. 3,928,646          Dated December 23, 1975

Inventor(s) Howard A. Hartley

It is certified that error appears in the above-identified patent and that said Letters Patent are hereby corrected as shown below:

The inventor is HOWARD A. HARTLEY, Columbus, Ohio.

Signed and Sealed this

Third Day of August 1976

[SEAL]

Attest:

RUTH C. MASON
*Attesting Officer*

C. MARSHALL DANN
*Commissioner of Patents and Trademarks*